(12) United States Patent
Kawasaki

(10) Patent No.: US 11,755,265 B2
(45) Date of Patent: Sep. 12, 2023

(54) PRINTING SYSTEM, SERVER SYSTEM FOR SETTING INFORMATION TO PERMIT REGISTRATION OF PRINTING APPARATUS BASED ON A REGISTRATION REQUEST FROM A USER

(71) Applicant: CANON KABUSHIKI KAISHA, Tokyo (JP)

(72) Inventor: Keiji Kawasaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/387,314

(22) Filed: Jul. 28, 2021

(65) Prior Publication Data
US 2022/0035581 A1 Feb. 3, 2022

(30) Foreign Application Priority Data
Jul. 29, 2020 (JP) .................................. 2020-128625

(51) Int. Cl.
*G06F 3/12* (2006.01)

(52) U.S. Cl.
CPC .......... *G06F 3/1238* (2013.01); *G06F 3/1204* (2013.01); *G06F 3/1222* (2013.01); *G06F 3/1288* (2013.01); *G06F 3/1285* (2013.01)

(58) Field of Classification Search
None
See application file for complete search history.

(56) References Cited

U.S. PATENT DOCUMENTS

| 10,817,232 | B2* | 10/2020 | Oikawa ................. G06F 21/608 |
| 2004/0196486 | A1 | 10/2004 | Uchino |
| 2011/0043867 | A1 | 2/2011 | Tonegawa |
| 2015/0015908 | A1* | 1/2015 | Tanaka ............... G06K 15/4095 |
| | | | 358/1.14 |
| 2015/0181060 | A1 | 6/2015 | Miyazawa |
| 2015/0277816 | A1 | 10/2015 | Adachi |

(Continued)

FOREIGN PATENT DOCUMENTS

| CN | 104284040 A | 1/2015 |
| CN | 107894876 A | 4/2018 |

(Continued)

Primary Examiner — Haris Sabah
(74) Attorney, Agent, or Firm — Canon U.S.A., Inc. IP Division

(57) ABSTRACT

A server system includes a setting unit configured to, based on an input from a user having first authority, set information indicating whether to permit registration of a printing apparatus based on a registration request from a user having second authority being more limited than the first authority, and a registration processing unit configured to, in a case where a registration request for registering a printing apparatus is received, perform processing for registering the printing apparatus based on the registration request, wherein, in a case where the user who has issued the registration request has the second authority and where the setting unit sets information indicating that the registration of a printing apparatus based on the registration request from the user having the second authority is permitted, the registration processing unit performs the registration of a printing apparatus based on the registration request from the user having the second authority.

10 Claims, 10 Drawing Sheets

(56) References Cited

U.S. PATENT DOCUMENTS

| | | | |
|---|---|---|---|
| 2016/0019013 A1* | 1/2016 | Ido | G06F 3/1286 |
| | | | 358/1.15 |
| 2018/0063360 A1* | 3/2018 | Ida | G06F 3/1287 |
| 2018/0129454 A1 | 5/2018 | Sako | |
| 2018/0330066 A1* | 11/2018 | Hase | G06F 21/305 |
| 2019/0294387 A1 | 9/2019 | Sako | |

FOREIGN PATENT DOCUMENTS

| | | |
|---|---|---|
| CN | 110875991 A | 3/2020 |
| EP | 1465051 A2 | 10/2004 |
| JP | S58172255 A | 10/1983 |
| JP | 2016-009466 A | 1/2016 |
| JP | 2016175248 A | 10/2016 |
| JP | 6672596 B2 | 3/2020 |

\* cited by examiner

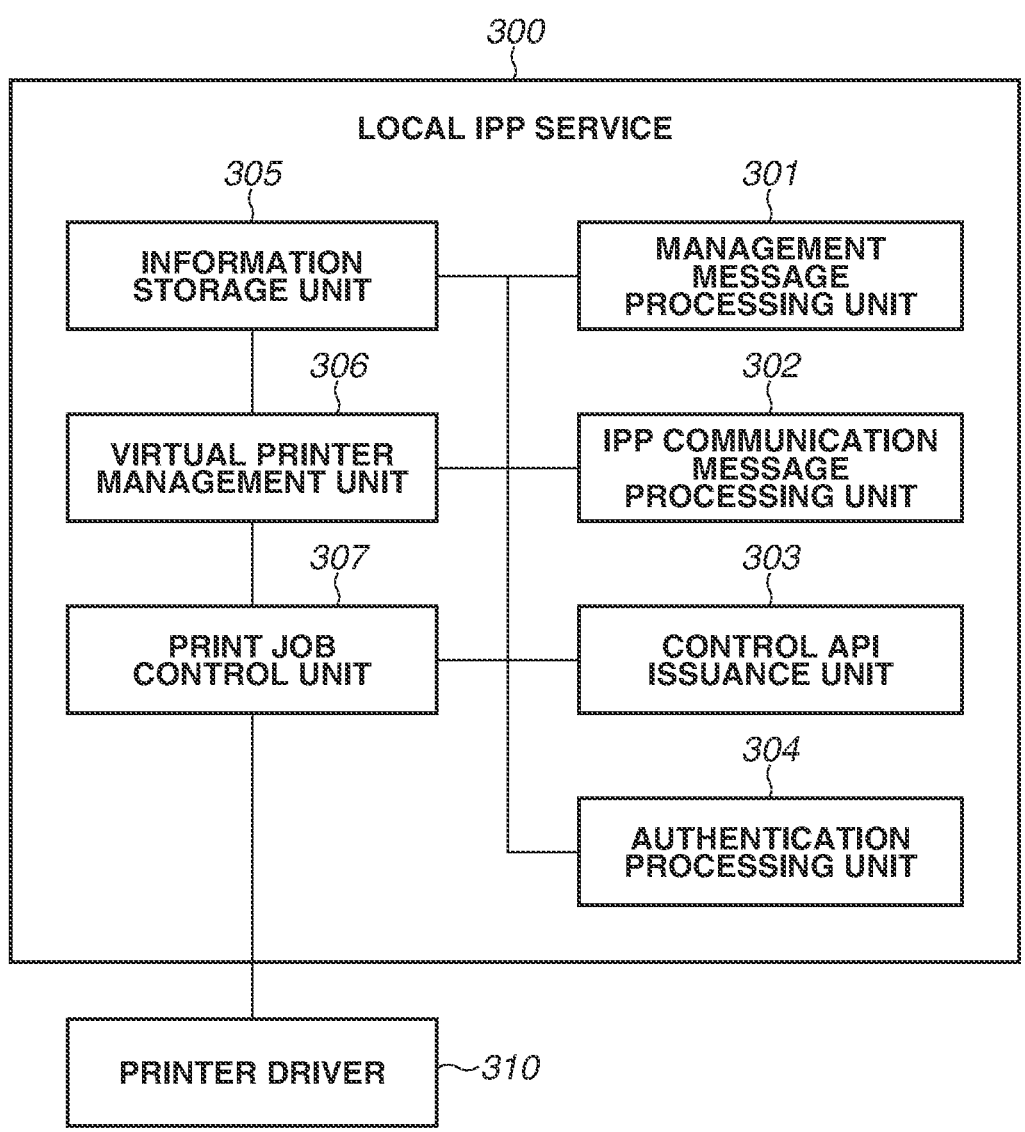

FIG.4

| CATEGORY | SETTING | VALUE |
|---|---|---|
| GENERAL INFORMATION | TENANT NAME | XY COMPANY |
| | ADMINISTRATOR NAME ~401 | ADMIN |
| PRINT INFORMATION | PRINTER REGISTRATION BY USER ~402 | PERMITTED |
| | USER PERMITTED TO REGISTER PRINTER ~403 | USER A |
| | CONFIRMATION BY ADMINISTRATOR ~404 | REQUIRED |
| PRINTER 1 INFORMATION | PRINTER NAME ~405 | PRINTER A |
| | DEVICE ID ~406 | PRINTER_A_XXXX |
| | REGISTRATION STATUS ~407 | REGISTERED |
| | SHARING SETTING ~408 | SHARED |
| | INITIAL SETTING ~409 | 2-UP, MONOCHROME |
| | USER WHO CAN USE PRINTER ~410 | USER A, USER B |
| | PRINTER CAPABILITY ~411 | PAPER SIZE: A3, A4...<br>MEDIA TYPE: PLAIN...<br>... |
| | PRINTER STATUS ~412 | IDLE |
| PRINTER 2 INFORMATION | PRINTER NAME | PRINTER B |
| | DEVICE ID | PRINTER_B_XXXX |
| | REGISTRATION STATUS | WAITING FOR APPROVAL |
| | SHARING SETTING | NOT SHARED |
| | INITIAL SETTING | DUPLEX |
| | USER WHO CAN USE PRINTER | NONE |
| | PRINTER CAPABILITY | PAPER SIZE: A4, LETTER...<br>MEDIA TYPE: PLAIN, PHOTO...<br>DUPLEX: ON, OFF<br>... |
| | PRINTER STATUS | NO PAPER |

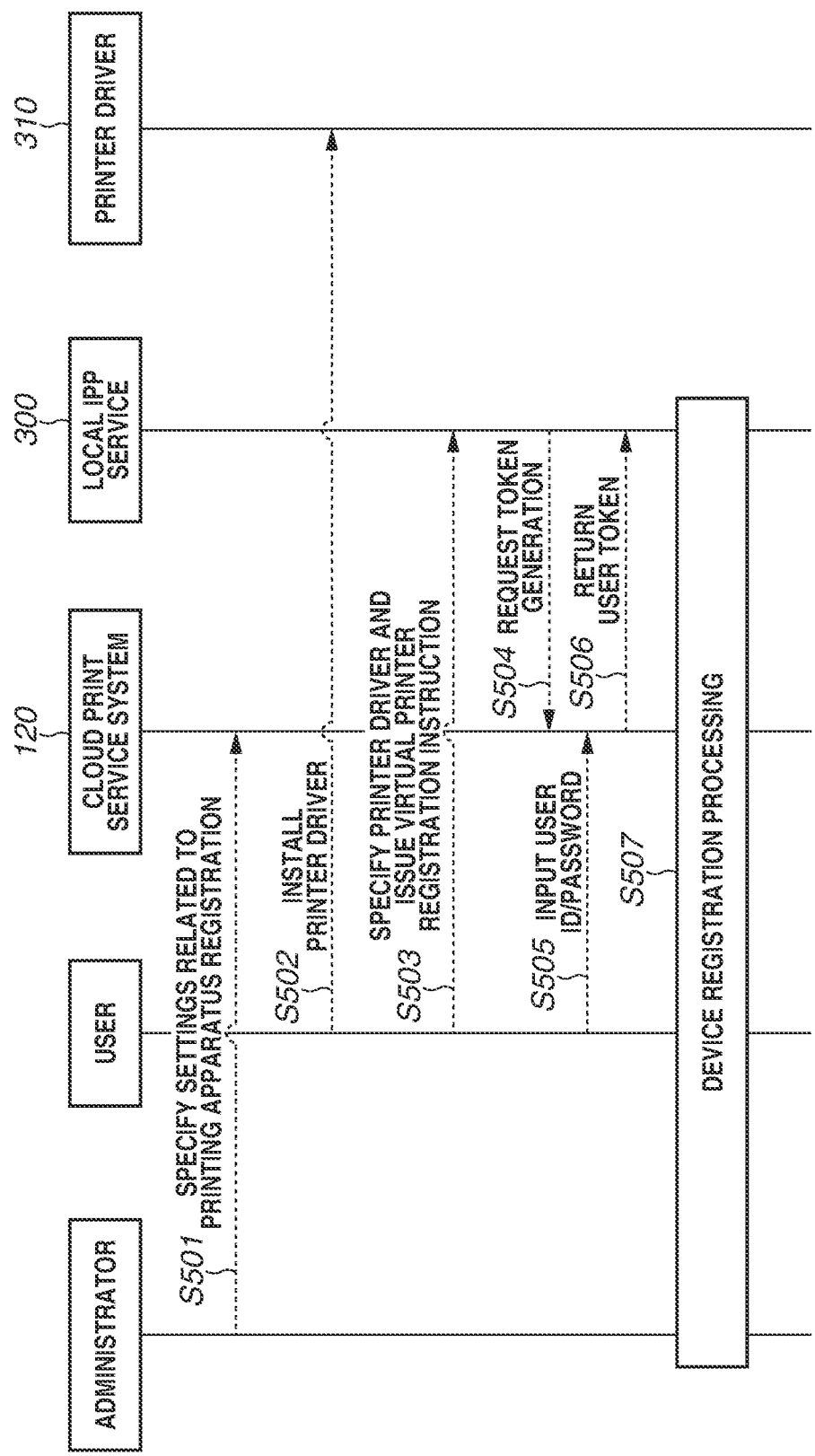

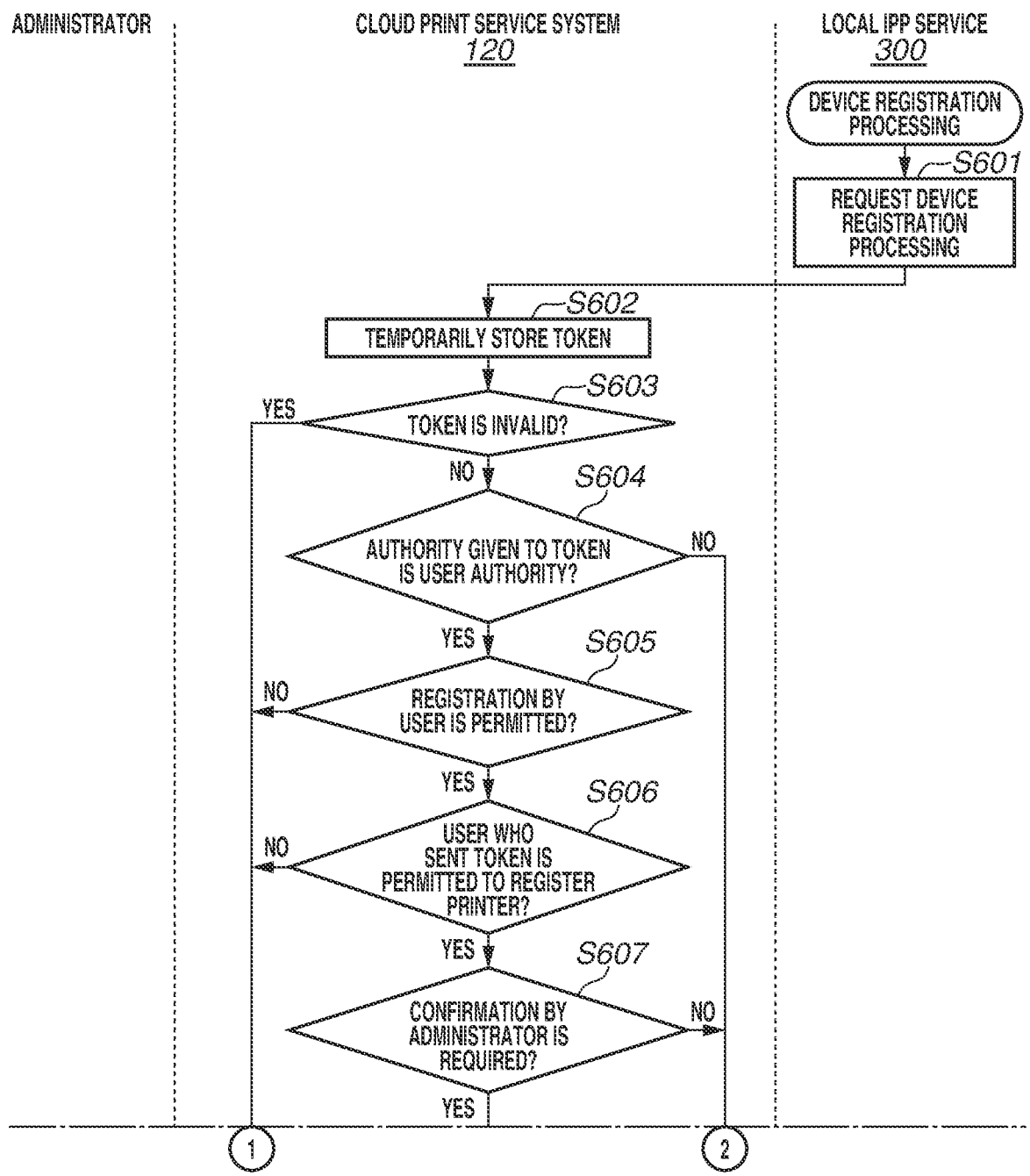

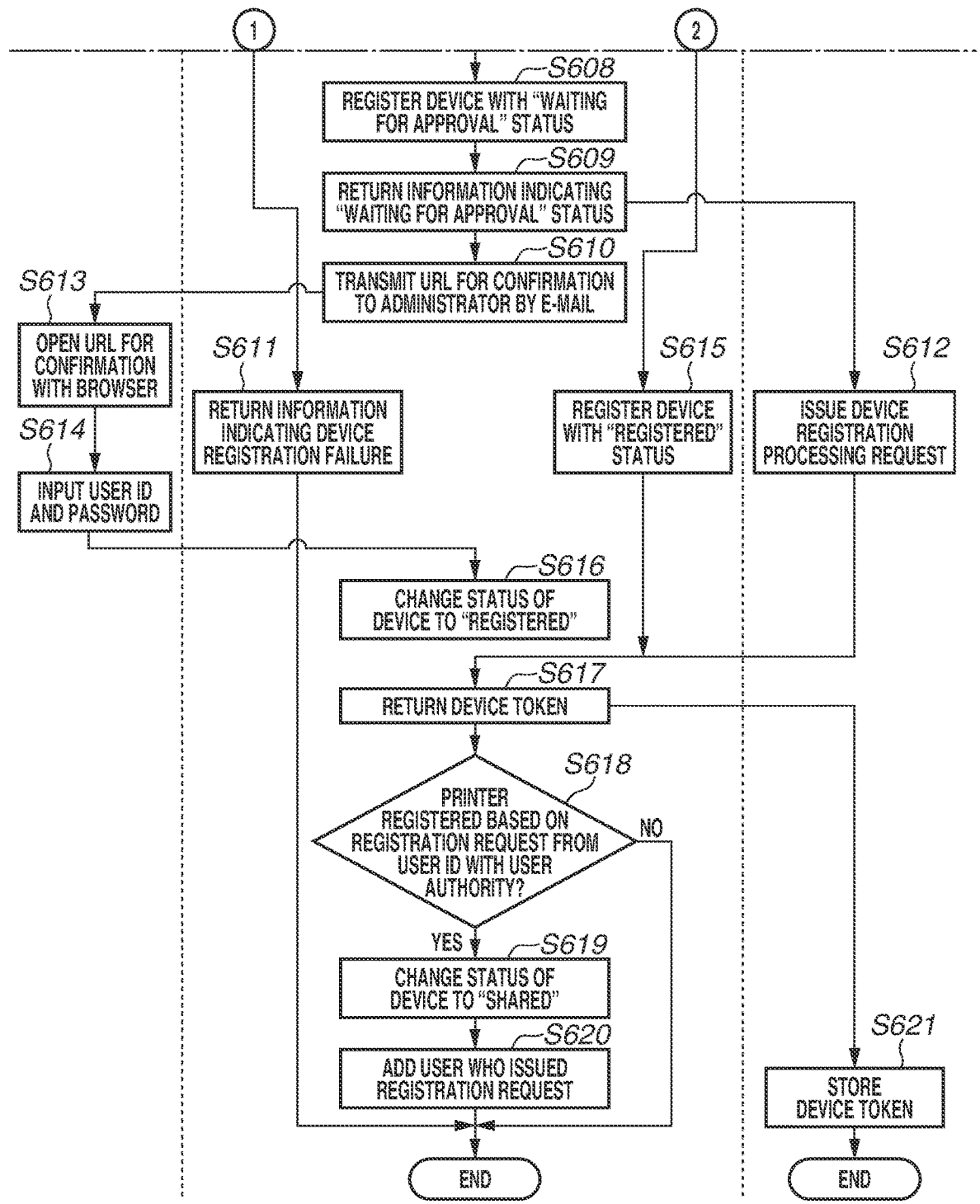

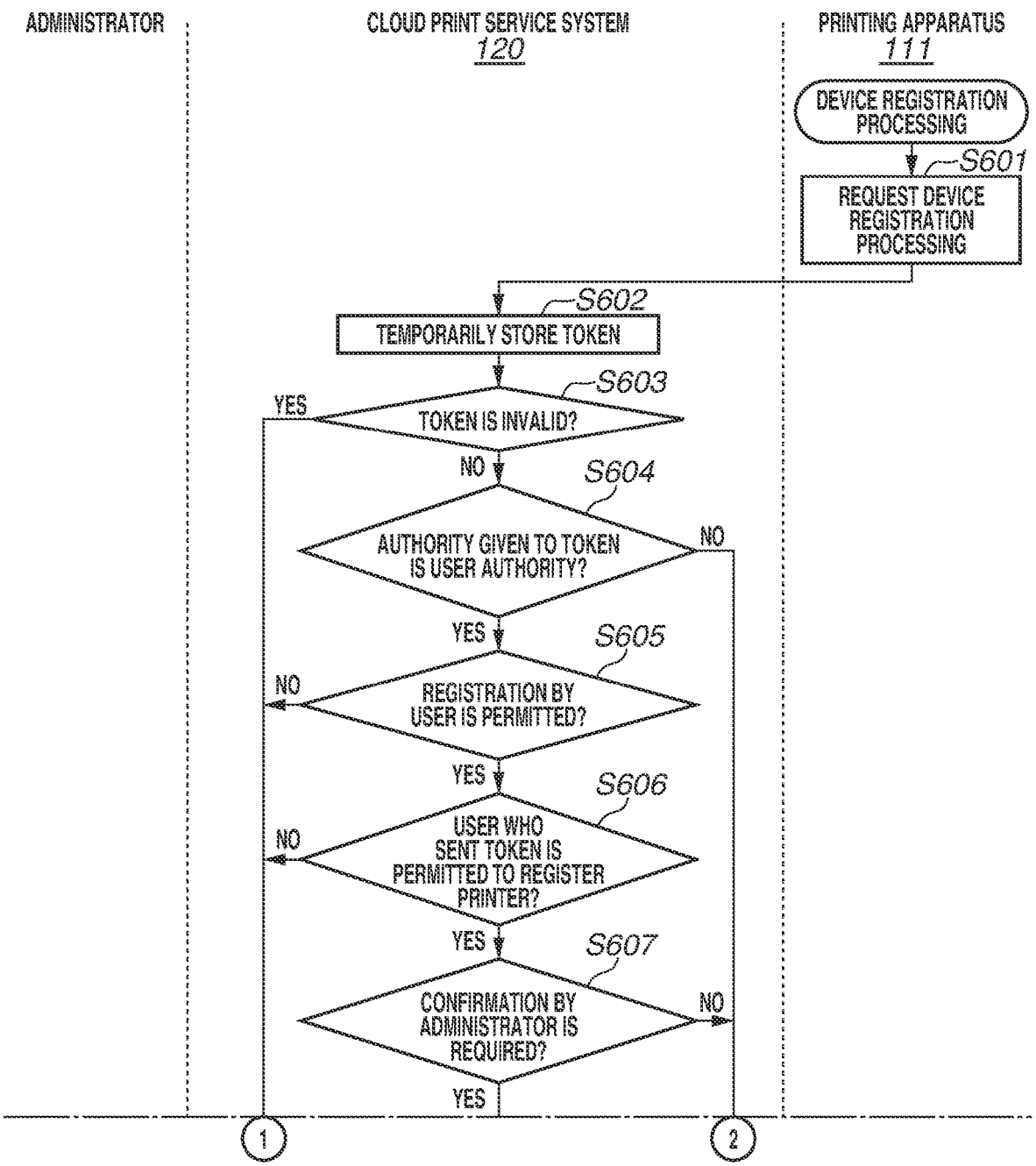

PRINTING SYSTEM, SERVER SYSTEM FOR SETTING INFORMATION TO PERMIT REGISTRATION OF PRINTING APPARATUS BASED ON A REGISTRATION REQUEST FROM A USER

BACKGROUND

Field of the Disclosure

The present disclosure relates to a printing system, a server system, and a printing apparatus.

Description of the Related Art

A configuration is known to perform printing from an information processing apparatus such as a personal computer (PC) via a server on a cloud. More specifically, the information processing apparatus issues a print request to a cloud print service system configured on the cloud and transmits a print request to a printing apparatus associated on the cloud print service system. When a plurality of users shares one printing apparatus, it is necessary to register the plurality of users as users of the printing apparatus registered to the cloud print service system. Japanese Patent No. 6672596 discloses a configuration in which, by prestoring an administrator identifier (ID) for using a cloud print service system in a printing apparatus, a user of the printing apparatus on the cloud print service system can be easily added.

Japanese Patent No. 6672596 describes a technique for easily adding a user to a printing apparatus that has already been registered to the cloud print service system.

SUMMARY

With the recent increase in need of remote working, a user may want to register a printing apparatus at home to a cloud print service system. There may be a similar case not only in using cloud printing but also in using other printing systems. Embodiments of the present disclosure are directed to providing a technique for easily registering the printing apparatus.

According to embodiments of the present disclosure, a printing system includes a printing apparatus and a server system, wherein the server system includes a setting unit configured to, based on an input from a user having first authority, set information indicating whether to permit registration of a printing apparatus based on a registration request from a user having second authority being more limited than the first authority, and a registration processing unit configured to, in a case where a registration request for registering a printing apparatus is received, perform processing for registering the printing apparatus based on the registration request, wherein, in a case where the user who has issued the registration request has the second authority and where the setting unit sets information indicating that the registration of a printing apparatus based on the registration request from the user having the second authority is permitted, the registration processing unit performs the registration of a printing apparatus based on the registration request from the user having the second authority, and wherein, by execution of the registration, the printing apparatus becomes capable of receiving a print job based on a print instruction from the user having the second authority via the server system.

Further features of the present disclosure will become apparent from the following description of exemplary embodiments with reference to the attached drawings.

BRIEF DESCRIPTION OF THE DRAWINGS

FIG. 3 is a function block diagram illustrating a software configuration of the information processing apparatus.

FIG. 4 illustrates examples of various types of setting information managed by a cloud print service.

FIG. 5 is a sequence diagram illustrating a procedure of registering a printing apparatus to the cloud print service.

FIGS. 6A and 6B are a flowchart illustrating details of device registration processing illustrated in FIG. 5.

FIGS. 7A and 7B are another flowchart illustrating details of the device registration processing illustrated in FIG. 5.

DESCRIPTION OF THE EMBODIMENTS

Figure 1:
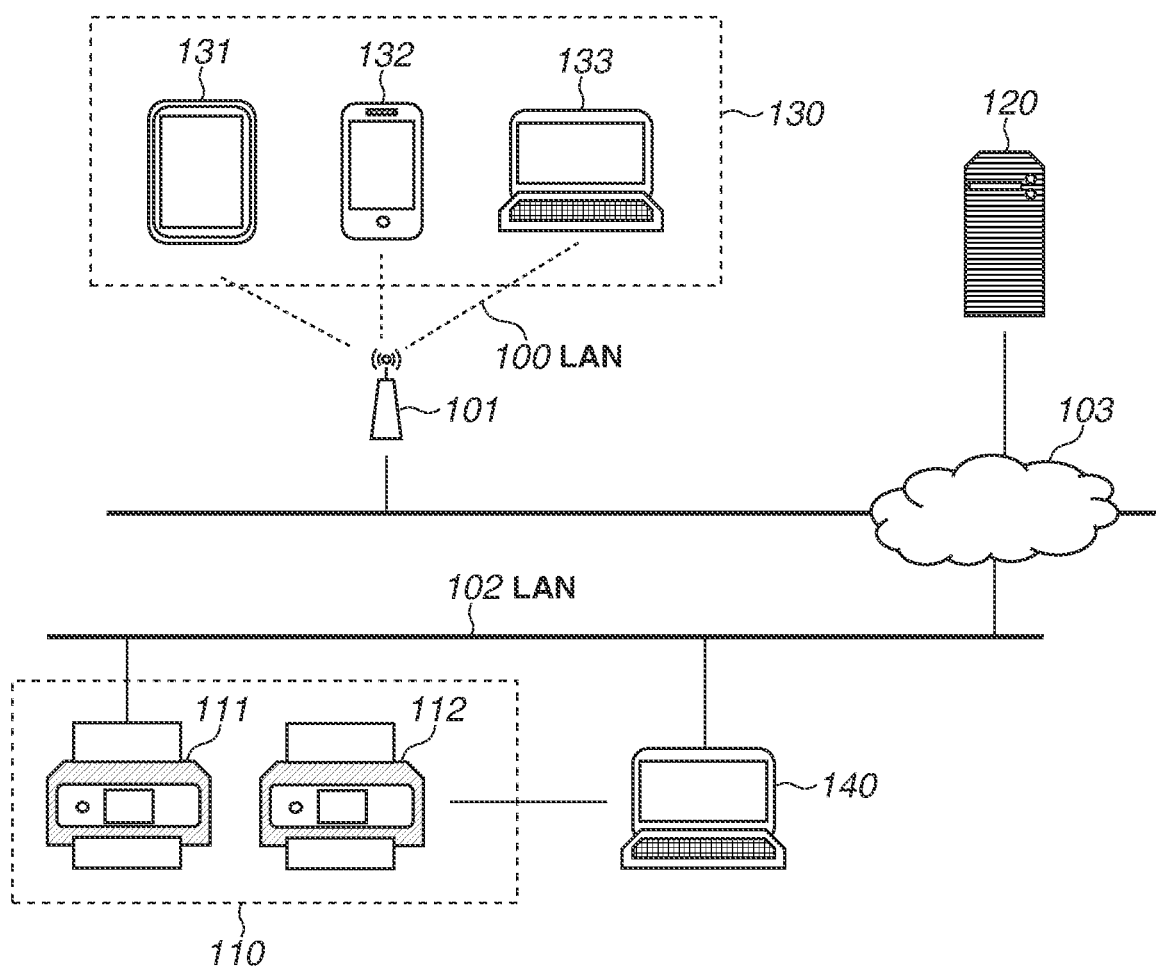
FIG. 1 illustrates a configuration of a printing system.

Exemplary embodiments of the present disclosure will be described in detail below with reference to the accompanying drawings. The following exemplary embodiments are not intended to limit the claims. Not all the combinations of features described in the exemplary embodiments are necessarily indispensable to embodiments of the present disclosure. Identical components are assigned the same reference numerals, and redundant descriptions thereof will be omitted.

<Configuration of Printing System>

FIG. 1 illustrates a configuration of a printing system according to an exemplary embodiment of the present disclosure. A printing apparatus 111 and an information processing apparatus 140 are connected to a Local Area Network (LAN) 102. Examples of the information processing apparatus 140 include a personal computer (PC). A printing apparatus 112 is connected to the information processing apparatus 140 by using a Universal Serial Bus (USB) cable. Although the printing apparatus 112 is not connected to the LAN 102 in FIG. 1, the printing apparatus 112 may be connected to the LAN 102 and configured to communicate with the information processing apparatus 140 via the LAN 102.

The printing apparatus 111 supports printing conforming to the Internet Printing Protocol (IPP) specifications and the standard specifications of cloud printing. In the present exemplary embodiment, the printing apparatus 111 conforms to the standard specifications of cloud printing named IPP Shared Infrastructure Extensions (hereinafter referred to as IPP-Infra) as an example of the standard specifications of cloud printing. The printing apparatus 111 can perform printing based on a cloud printing function conforming to the standard specifications of cloud printing. On the other hand, the printing apparatus 112 supports the printing conforming to the IPP specifications but does not support the printing conforming to the standard specifications of cloud printing. Hereinafter, the printing apparatuses 111 and 112 may be collectively referred to as printing apparatuses 110.

A tablet 131, a smart phone 132, and a PC 133 are connected to a LAN 100 configured by using an access point (AP) 101. Hereinafter, the tablet 131, the smart phone 132, and the PC 133 may be collectively referred to as information processing apparatuses 130. The LANs 100 and 102 are connected to an Internet 103. A cloud server system (hereinafter referred to as a cloud print service system) 120 that provides a print service on a cloud is connected to the Internet 103. The information processing apparatuses 130, the information processing apparatus 140, and the printing apparatus 111 can communicate with the cloud print service system 120 via the Internet 103.

The cloud print service system 120 supports, for example, a cloud print function conforming to IPP-Infra. The cloud print service system 120 temporarily stores print data conforming to the IPP specifications. Then, in response to a request from the printing apparatus 111 conforming to cloud print specifications based on IPP-Infra, the cloud print service system 120 can transmit print data to a printing apparatus based on IPP-Infra specifications.

An operating system (OS) in the information processing apparatuses 130 is provided with, as a standard, a program (referred to as an IPP-Client module) capable of generating print data based on the IPP specifications. By using the IPP-Client module, the information processing apparatuses 130 can generate print data based on the IPP specifications. When the information processing apparatuses 130 transmit a print job to the cloud print service system 120 in response to a print instruction from the user, the cloud print service system 120 reserves the print job on the cloud.

When the print job is stored in the cloud print service system 120, the printing apparatus 111, which supports cloud printing conforming to the IPP-Infra specifications, issues a print job acquisition request to the cloud print service system 120. The printing apparatus 111 may periodically issue the print job acquisition request to the cloud print service system 120. Alternatively, upon issuance of a print job acquisition instruction by the user on the printing apparatus 111, the printing apparatus 111 may issue the print job acquisition request to the cloud print service system 120. Yet alternatively, when a print job is stored in the cloud print service system 120, the cloud print service system 120 may issue a notification that a print job has been stored in the cloud print service system 120 to the printing apparatus 111. In this case, upon reception of the notification that a print job has been stored, the printing apparatus 111 transmits the print job acquisition request to the cloud print service system 120.

Upon reception of the request from the printing apparatus 111, the cloud print service system 120 transmits the print job reserved in the cloud print service system 120 to the printing apparatus 111. Thus, the printing apparatus 111 acquires the print job and then performs printing.

To use the cloud print service system 120, a user (administrator) having administrator authority on the cloud print service system 120 needs to register a printing apparatus to the cloud print service system 120. More specifically, the user operates the printing apparatus 111 in advance to perform processing for registering the printing apparatus to the cloud print service system 120.

As in the information processing apparatuses 130, the IPP-Client module is also installed in the information processing apparatus 140. A program of a local IPP service 300 is also installed therein (the program will be described below with reference to FIG. 3). When viewed from the cloud print service system 120, the local IPP service 300 is software (application) that behaves in the same way as a printing apparatus that supports the cloud printing function conforming to the IPP-Infra specifications. The information processing apparatus 140 with the software installed therein can issue a print job acquisition request to the cloud print service system 120 in the same way as the printing apparatus 111. The local IPP service 300 converts the received print job into a format that can be interpreted by a printer driver 310 (described below) to generate a spool file and then sends the print job to the printer driver 310. The printer driver 310 generates a print command that can be interpreted by the printing apparatus 112.

The printing apparatus 112 performs printing based on a print command received from the information processing apparatus 140 via a USB interface or a LAN. By using the local IPP service 300 installed in the information processing apparatus 140 connected to the printing apparatus 112 in this way, the printing apparatus 112 can print the print job from the cloud print service system 120. More specifically, based on a print instruction from the information processing apparatuses 130, the print job is output to the printing apparatus 112 via the cloud print service system 120 and the information processing apparatus 140. Such a configuration enables the information processing apparatuses 130 to issue a print instruction to the printing apparatus 112 that does not support the standard specifications of cloud printing.

When the information processing apparatus 140 issues a print instruction, the information processing apparatus 140 may transmit a print job to the printing apparatus 112 via a USB interface or a LAN as usual. Since the IPP-Client module is also installed in the information processing apparatus 140, the information processing apparatus 140 can also issue a print instruction to the printing apparatus 111 via the cloud print service system 120.

The cloud print service system 120 according to the present exemplary embodiment may include one server or a plurality of on-cloud servers that operate in a cooperative way to implement each function. The cloud print service system 120 may include a server apparatus on a local network. While, in the present exemplary embodiment, the cloud print service system 120 has the above-described configuration as an example printing system, the present disclosure is not limited thereto. The information processing apparatuses 130, the cloud print service system 120, and the printing apparatuses 110 may be communicably connected with each other via a network. The network may be a wireless or a wired network.

<Hardware Configurations of Information Processing Apparatus and Cloud Print Service>

Figure 2:
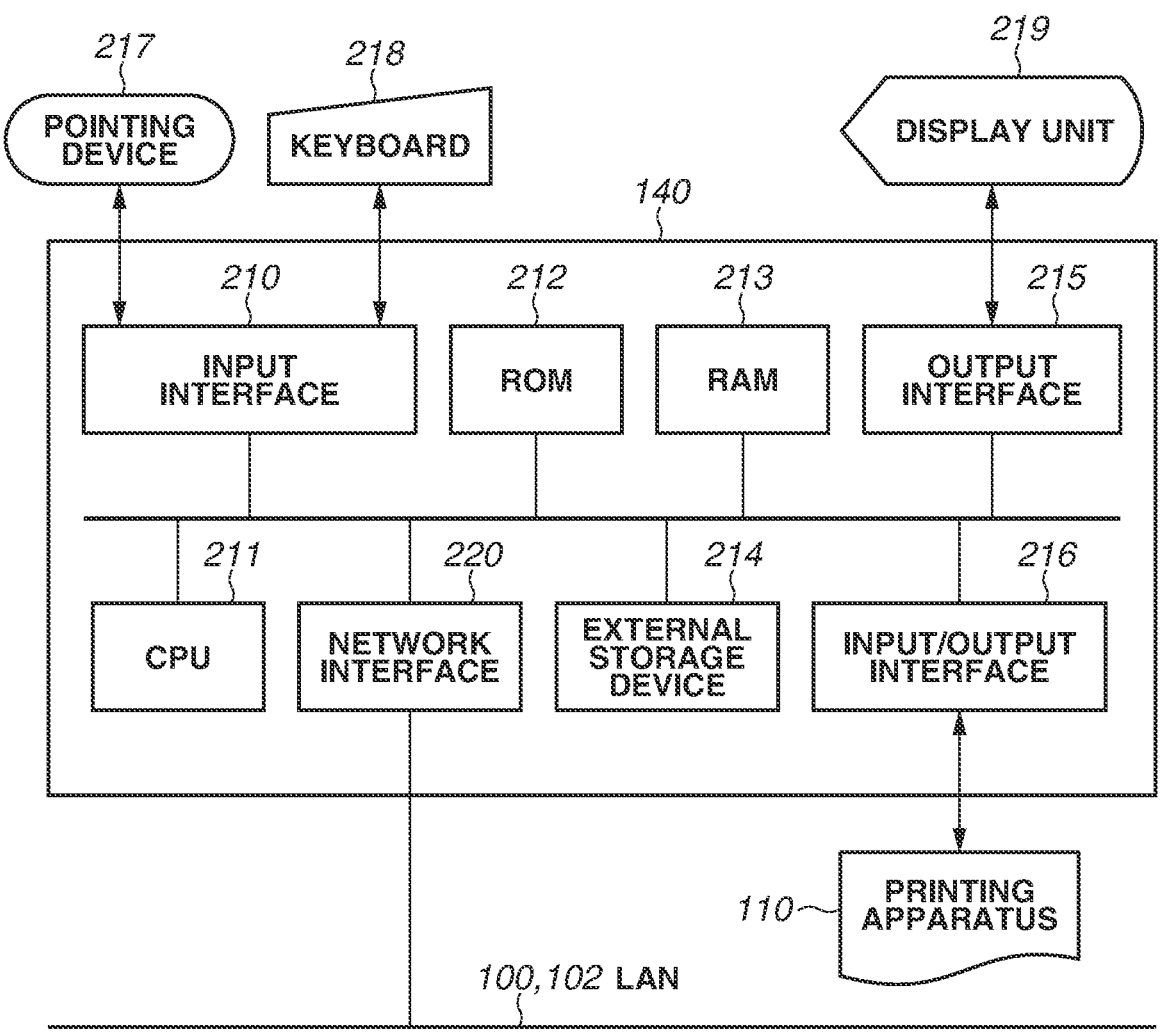
FIG. 2 is a block diagram illustrating a hardware configuration of an information processing apparatus and a cloud print service system.

FIG. 2 is a block diagram illustrating a hardware configuration of the information processing apparatus 140. Referring to FIG. 2, the information processing apparatus 140, for example, is a PC and includes an input interface 210, a central processing unit (CPU) 211, a read only memory (ROM) 212, a random access memory (RAM) 213, an external storage device 214, an output interface 215, and an input/output interface 216. The input interface 210 is connected with input devices such as a keyboard 218 and a pointing device 217. The output interface 215 is connected with a display device such as a display unit 219.

The ROM 212 stores an initialization program. The external storage device 214 stores a group of application programs, an operating system (OS), and other various types of data. The RAM 213 is used as a work memory at the time of execution of various programs stored in the external storage device 214. The information processing apparatus 140 is connected to the LAN 102 via a network interface (I/F) 220.

In the present exemplary embodiment, the function of the information processing apparatus 140 (described below) and processing related to flowcharts (described below) are implemented by the CPU 211 performing processing based on the procedure of a program stored in the ROM 212. The printing apparatuses 110, which are devices, are connected to the information processing apparatus 140 via the input/output interface 216. While, in the present exemplary embodiment, the information processing apparatus 140 and the printing apparatuses 110 are configured to be separate apparatuses, these apparatuses may be configured as one information processing apparatus. While the printing apparatuses 110 will be described using an ink jet printer that performs printing by discharging ink on paper as an example, printing may be performed by other methods (e.g., electrophotographic method). The information processing apparatus 140 may be a server apparatus, a desktop PC, a smart phone, or a laptop computer.

The hardware configurations of the information processing apparatuses 130 and the cloud print service system 120 are the same as the hardware configuration illustrated in FIG. 4, and redundant descriptions thereof will be omitted.

<Software Configuration of Information Processing Apparatus>

FIG. 3 is a function block diagram illustrating a software configuration related to print processing performed by the information processing apparatus 140 according to the exemplary embodiment. While each software module or each function block may be described below as being the subject of processing, in actuality, a corresponding function is implemented by the CPU 211 executing a corresponding program.

The local IPP service 300 includes a management message processing unit 301, an IPP communication message processing unit 302, a control Application Programming Interface (API) issuance unit 303, an authentication processing unit 304, an information storage unit 305, a virtual printer management unit 306, and a print job control unit 307. The management message processing unit 301 receives, generates, and transmits a management message conforming to the specifications of the cloud print service system 120. The IPP communication message processing unit 302 receives, generates, and transmits an IPP communication message. The control API issuance unit 303 issues a control API to the cloud print service system 120. The control API refers to an end point provided by the cloud print service system 120. A request for acquiring information stored in the cloud print service system 120 and a setting change instruction can be issued via the control API.

The authentication processing unit 304 issues an authentication request according to the specifications of the cloud print service system 120. The information storage unit 305 stores a token acquired by the authentication processing unit 304 performing authentication and information about a virtual printer generated by the virtual printer management unit 306. The virtual printer management unit 306 generates and changes the information about a virtual printer to be registered on the local IPP service 300. The print job control unit 307 converts a print job received by the IPP communication message processing unit 302 into a format that can be interpreted by the printer driver 310 and then sends the print job to the printer driver 310. These processing units can communicate with each other.

The user can register a virtual printer in the information processing apparatus 140 by using a function of the local IPP service 300. The user can associate the printer driver 310 with a virtual printer. In the same way as the printing apparatus conforming to the standard specifications of cloud printing, the management message processing unit 301 and the IPP communication message processing unit 302 of the local IPP service 300 can receive a print job and register a printing apparatus to a cloud printing system. This enables the information processing apparatus 140 to register a virtual printer registered in the local IPP service 300 to the cloud print service system 120 and then receive a print job from the cloud print service system 120 based on IPP-Infra.

The local IPP service 300 converts the received print job into a format that can be interpreted by the printer driver 310 and then sends the print job to the printer driver 310. The printing apparatus 112 connected to the information processing apparatus 140 performs print processing through the processing performed by the printer driver 310.

By using the local IPP service 300 installed in the information processing apparatus 140 connected to the printing apparatus 112 in this way, even a printing apparatus not conforming to the standard specifications of cloud printing can perform printing based on a print job received from the cloud print service system 120.

<Software Configuration of Cloud Print Service>

Figure 8:
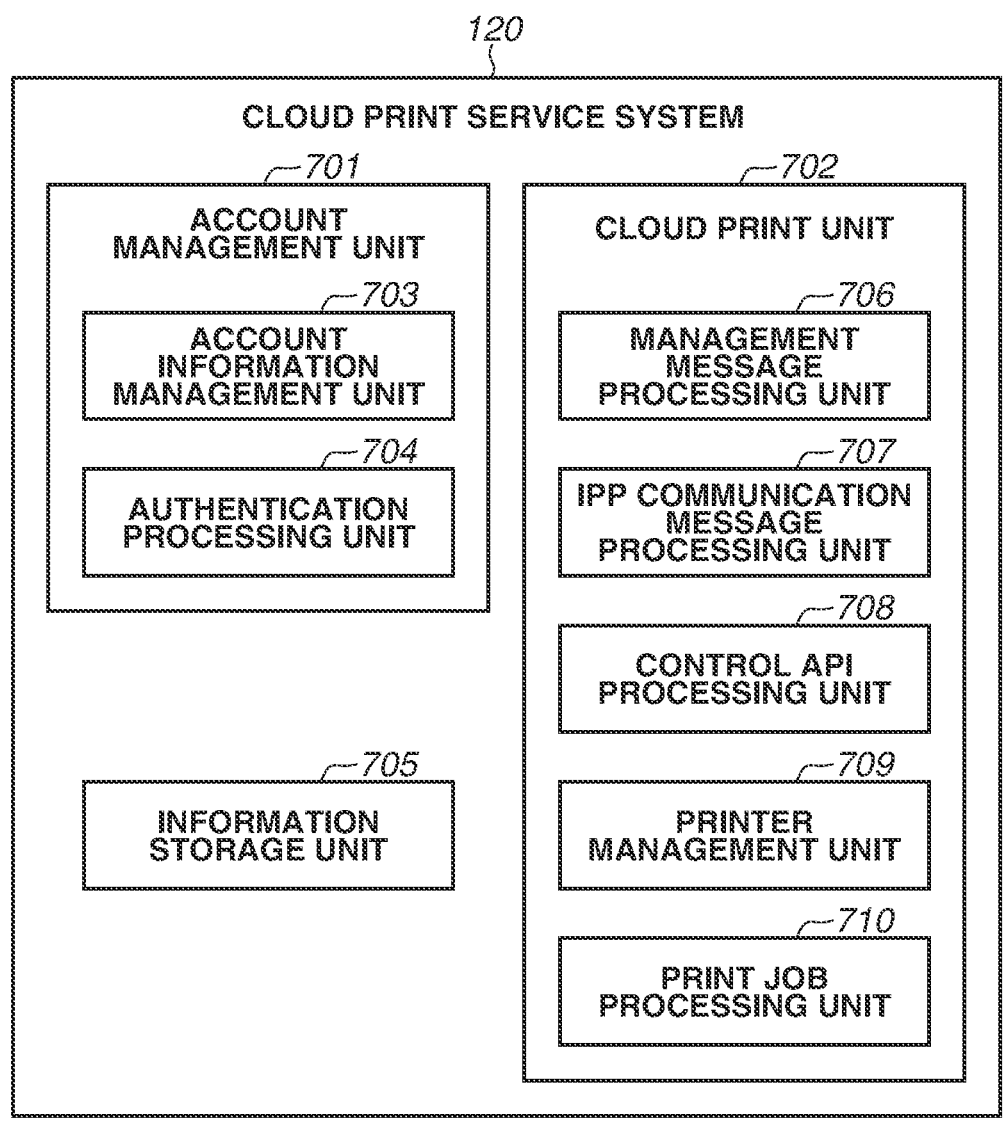
FIG. 8 is a function block diagram illustrating a software configuration of the cloud print service.

FIG. 8 is a function block diagram illustrating a software configuration of the cloud print service system 120 according to the exemplary embodiment. While each software module or each function block may be described below as being the subject of processing, in actuality, a corresponding function is implemented by the CPU 211 executing a corresponding program.

The cloud print service system 120 includes an account management unit 701 and a cloud print unit 702. The account management unit 701 includes an account information management unit 703 and an authentication processing unit 704. The account information management unit 703 manages information about users who use the cloud print service system 120. The user information is stored in an information storage unit 705. The authentication processing unit 704 verifies validity of an account and a password, and issues a token indicating authority information for accessing the cloud print service system 120.

The cloud print unit 702 includes a management message processing unit 706, an IPP communication message processing unit 707, a control API processing unit 708, a printer management unit 709, and a print job processing unit 710. The management message processing unit 706 receives, generates, and transmits a management message conforming to the specifications of the cloud print service system 120. The IPP communication message processing unit 707 receives, generates, and transmits an IPP communication message. The control API processing unit 708 receives a control API, performs processing based on a request, and changes various settings. The printer management unit 709 manages printers registered to the cloud print service system 120. Various kinds of printer information are stored in the information storage unit 705. The print job processing unit 710 stores and edits a print job issued to the cloud print service system 120 and then received by the IPP communication message processing unit 707. In response to a print job acquisition request received by the IPP communication message processing unit 707, the print job processing unit 710 sends the print job to the IPP communication message processing unit 707.

The cloud print service system 120 having the above-described configuration plays the role of a server in cloud printing conforming to the IPP-Infra specifications. A plurality of printers can be registered to the cloud print service system 120 by the printer management unit 709. The cloud print service system 120 also includes the account management unit 701 and functions as a directory service for managing the users of the cloud service. The account management unit 701 and the cloud print unit 702 may be configured as separate services.

<Information Managed by Cloud Print Service>

FIG. 4 is a table schematically illustrating an example of representative information of various setting information managed by the cloud print service system 120 according to the present exemplary embodiment. The cloud print service system 120 is configured to be usable by each of plurality of groups such as companies and is managed so that one company cannot see information about other companies. Each group is referred to as a tenant (directory). FIG. 4 illustrates setting information for a tenant named "XY Company". A setting 401 refers to an administrator name and stores the user identifier (ID) having the administrator authority, which is the right to change various settings of the tenant, as the value thereof. A plurality of user IDs may be stored as the value of the administrator name. The administrator authority indicates the user who is given the authority to permit the printing apparatus registration in the cloud print service system 120. The user having the administrator authority may also be referred to as an administrator.

A setting 402 classified as printing information stores information indicating whether printer registration by the user ID having user authority is permitted. A setting 403 refers to information about a user permitted to register a printer and stores the user ID of the user permitted to register a printer as the value thereof. In the setting 403, a plurality of user IDs can be registered. A setting 404 stores information about whether confirmation by the administrator is required when a printer registration request (registration request) by the user ID having the user authority is issued. A difference in behavior due to these setting values will be described below with reference to FIGS. 6A and 6B. The values of the settings 402, 403, and 404 can be changed by the administrator. The user authority is more limited than the administrator authority. For example, the values of the settings 402, 403, and 404 that can be changed by the administrator authority cannot be changed by the user authority.

Two different printers, a printer named Printer 1 and a printer named Printer 2, are registered in the tenant illustrated in FIG. 4. The printers illustrated in FIG. 4 refer to logical printers registered to the cloud print service system 120. Each of these logical printers is associated with a physical printing apparatus (printer) such as the printing apparatus 111 in FIG. 1 or a virtual printing apparatus (printer) registered in the local IPP service 300 of the information processing apparatus 140. An issued print request is accumulated in the corresponding logical printer. Upon issuance of a request for acquiring a print job from an actual physical printing apparatus registered in association with the logical printer, the print job is deleted from the logical printer.

Three or more printers can be registered to the cloud print service system 120. In such a case, pieces of information for the number of registered printers are stored. A setting 405 refers to a printer name and stores the name of the printer as the value thereof. A setting 406 refers to a device ID and stores the ID that uniquely identifies the printer as the value thereof. A setting 407 refers to a registration status and stores the value indicating the registration status of the printer. The registration status of Printer 1 is "Registered" indicating that the printer is in a usable state. On the other hand, the registration status of Printer 2 is "Waiting for Approval" indicating that the printer is waiting for approval by the administrator. The relationship between the registration procedure for the cloud print service system 120 and the registration status in the setting 407 will be described below with reference to FIGS. 6A and 6B.

A setting 408 refers to a sharing setting and stores the value indicating whether the printer is in a shared state where the printer can be used by other users. A setting 409 refers to an initial setting that is the print settings in a default state when printing is performed on the printer in the cloud print service system 120. A setting 410 refers to users who can use the applicable printer in the cloud print service system 120. While two users (User A and User B) are registered in this example, three or more users may be registered.

The values of the settings 408, 409, and 410 can be changed by the administrator. A setting 411 refers to printer capability and stores the print settings that can be specified for the printer and the setting values thereof. A setting 412 refers to a printer status and stores the current status of the registered printing apparatus. The status changes depending on the state of the associated printing apparatus.

As described above, the cloud print service system 120 can register a plurality of printing apparatuses. Further, a user who can use each of the printing apparatuses can also be set.

<Sequence of Registering Printing Apparatus to Cloud Print Service>

FIG. 5 is a sequence diagram illustrating a procedure of registering a printing apparatus to the cloud print service system 120 according to an exemplary embodiment. While each software module or each function block may be described below as being the subject of processing, in actuality, a corresponding function is implemented by the CPU 211 executing a corresponding program. Hereinafter, the user as the administrator logs into an account with the administrator authority of the cloud print service system 120 by using one of the information processing apparatuses 130 in FIG. 1.

In step S501, the information processing apparatus 130 of the administrator accesses a front end provided by the cloud print service system 120 and specifies the settings related to the printing apparatus registration with the user authority. The settings include the settings 402, 403, and 404 in FIG. 4. The difference in operation due to these setting values will be described below with reference to FIGS. 6A and 6B. The cloud print service system 120 sets (stores) each of the specified setting values based on an input by the administrator.

In step S502, in response to a user instruction, the information processing apparatus 140 installs therein the printer driver 310 corresponding to the printing apparatus 112 connected to the information processing apparatus 140. When the printer driver 310 is installed, the user can issue a print instruction from any application (such as a drawing application) installed in the information processing apparatus 140 to the printing apparatus 112.

In step S503, in response to a user instruction, the information processing apparatus 140 activates the local IPP service 300 installed in the information processing apparatus 140. Then, when the user specifies the printer driver 310 installed in the information processing apparatus 140 and issues a registration instruction, the local IPP service 300 receives the registration instruction as a request for registering a virtual printer to be associated with the specified printer driver 310. For example, when the user specifies the printer driver 310 of the printing apparatus 112 on the screen provided by the local IPP service 300, the local IPP service 300 receives the request for registering a virtual printer associated with the printing apparatus 112.

In step S504, the local IPP service 300 in the information processing apparatus 140 issues a token generation request to the cloud print service system 120. More specifically, upon receipt of the request for registering a virtual printer, the virtual printer management unit 306 of the local IPP service 300 requests the authentication processing unit 304 to perform authentication processing. Further, the authentication processing unit 304 of the local IPP service 300 issues a user token generation request to the cloud print service system 120. A user token refers to information including operation authority in the cloud print service system 120 acquired by the authentication to the cloud print service system 120. When various services provided by the cloud print service system 120 are used, the user token is added to a request from the user. The cloud print service system 120 verifies the received user token. Then, if the cloud print service system 120 determines that the user token has the authority to execute the requested operation, the cloud print service system 120 executes the requested operation.

When the local IPP service 300 issues the user token generation request to the cloud print service system 120, a login page provided by the cloud print service system 120 is displayed by a web browser installed in the information processing apparatus 140.

In step S505, the cloud print service system 120 receives, from the user, inputs of the user ID and password managed by the cloud print service system 120 on the login page that is provided by the cloud print service system 120 and displayed on the web browser. With regard to the user ID and the password, when the account management unit 701 is requested to register an account, a guidance for account registration and a temporary password are notified to the user by e-mail. Subsequently, the user can change the password to a desired one.

In step S506, the cloud print service system 120 verifies the user ID and password input by the user. Then, when the cloud print service system 120 confirms (authenticates) that the input user ID and password are the usable registered user ID and password, the cloud print service system 120 returns the user token (authentication information) including authority information given to the input user ID to the local IPP service 300.

Subsequently, in step S507, the local IPP service 300 requests the cloud print service system 120 to register a device (printing apparatus) by using the user token. Device registration processing in step S507 will be described below with reference to FIGS. 6A and 6B.

In the description of the example in FIG. 5, since the printing apparatus 112 not conforming to the standard specifications of cloud printing is registered, the user operates the information processing apparatus 140 to instruct the local IPP service 300 to perform various types of processing. However, to register the printing apparatus 111 conforming to the standard specifications of cloud printing, the user can also operate the printing apparatus 111 to instruct the printing apparatus 111 to perform various types of processing.

In other words, the processing performed by the local IPP service 300 in FIG. 5 can also be performed by the printing apparatus 111 conforming to the standard specifications of cloud printing. However, in a case where the printing apparatus 111 performs the processing performed by the local IPP service 300, the user does not specify the printer driver 310 in step S503 but issues an instruction for registering the printing apparatus 111 currently being operated. Then, the printing apparatus 111 receives the registration instruction.

In a case where the printing apparatus 111 has a function corresponding to the web browser, in step S504, the printing apparatus 111 issues a token generation request to the cloud print service system 120 in response to the registration instruction.

Upon reception of the request, in step S505, the printing apparatus 111 displays the login page provided by the cloud print service system 120. The subsequent processing can be performed by replacing the local IPP service 300 with the printing apparatus 111 in the descriptions in FIG. 5.

In a case where the printing apparatus 111 does not have a function corresponding to the web browser, the printing apparatus 111 may provide a function of performing processing in step S504 and subsequent steps on Remote User Interface (UI), enabling the administrator and the user to issue the registration processing instruction from the Remote UI.

<Procedure of Registering Printing Apparatus to Cloud Print Service>

FIGS. 6A and 6B are a flowchart illustrating detail of the processing in step S507 in FIG. 5. While each software module or each function block may be described below as being the subject of processing, in actuality, a corresponding function is implemented by the CPU 211 executing a corresponding program.

Upon reception of the user token in step S506 in FIG. 5, in step S601, the local IPP service 300 requests the cloud print service system 120 to perform the device registration processing. At this timing, the local IPP service 300 transmits the token received in the processing in step S506 in FIG. 5 and information about the device to be registered to the cloud print service system 120. For example, the information about the device includes the printer name in the setting 405 in FIG. 4. The device to be registered is the virtual printer registered in the local IPP service 300 in association with the printer driver specified in step S503 in FIG. 5. Thus, when the user specifies the printer driver 310 of the printing apparatus 112 in step S503, in step S601, the name of the virtual printer registered in the local IPP service 300 is transmitted as the information about the device.

In step S602, the cloud print service system 120 temporarily stores the token received from the local IPP service 300.

In step S603, the cloud print service system 120 verifies the received token. If the cloud print service system 120 determines that the received token is an invalid token that does not have the right to use the cloud print service system 120 (YES in step S603), the processing proceeds to step S611. In step S611, the cloud print service system 120 returns information indicating that the device registration has failed to the local IPP service 300. Then, the processing ends.

On the other hand, if the cloud print service system 120 verifies that the token is valid (NO in step S603), the processing proceeds to step S604.

In step S604, the cloud print service system 120 determines whether the administrator authority or the user authority is given to the token. If the cloud print service system 120 determines that the administrator authority is given to the token (NO in step S604), the processing proceeds to step S615.

In step S615, the cloud print service system 120 registers the device the registration of which has been requested with the "Registered" status. More specifically, as with Printer 1 illustrated in FIG. 4, the registration refers to changing the setting 407 to the "Registered" status and storing the setting values of the Printer 1 information. In this state, a print job can be transmitted to a printer registered to the cloud print service system 120. Then, the processing proceeds to step S617. Processing in step S617 and subsequent steps will be described below.

On the other hand, if the cloud print service system 120 determines that the user authority is given to the token (YES in step S604), the processing proceeds to step S605.

In step S605, the cloud print service system 120 determines whether the printing apparatus registration based on a registration request by the user ID having the user authority is permitted. The cloud print service system 120 performs the determination based on whether the value indicating permission is stored in the setting 402 in FIG. 4. If the cloud print service system 120 determines that the registration by the user ID having the user authority is not permitted (NO in step S605), the processing proceeds to step S611, and then the processing ends. On the other hand, if the cloud print service system 120 determines that the registration by the user ID having the user authority is permitted (YES in step S605), the processing proceeds to step S606.

In step S606, the cloud print service system 120 identifies the user ID that transmitted the token based on the information included in the token and determines whether the user is permitted to register a printer. The cloud print service system 120 performs the determination based on whether the user ID identified based on the token is included (described) in the setting 403 in FIG. 4.

If the cloud print service system 120 determines that the user is not permitted to register a printer (NO in step S606), the processing proceeds to step S611, and the processing ends. On the other hand, if the cloud print service system 120 determines that the user is permitted to register a printer (YES in step S606), the processing proceeds to step S607.

In step S607, the cloud print service system 120 determines whether confirmation by the administrator is required to register a printing apparatus by using the user ID having the user authority. The cloud print service system 120 performs the determination based on whether the value indicating necessity of the confirmation by the administrator is set in the setting 404 in FIG. 4. If the cloud print service system 120 determines that the confirmation by the administrator is not required (NO in step S607), the processing proceeds to step S615. On the other hand, if the cloud print service system 120 determines that the confirmation by the administrator is required (YES in step S607), the processing proceeds to step S608.

In step S608, the cloud print service system 120 changes the registration status to "Waiting for Approval" and then registers the device (printing apparatus 112) the registration of which has been requested. The registration status is the setting value indicated in the setting 407 in FIG. 4. For example, FIG. 4 illustrates that the registration status of Printer 2 is "Waiting for Approval". The cloud print service system 120 is configured not to receive a print request to such a printer having the registration status "Waiting for Approval". In other words, the user ID having the user authority is not permitted to issue a print instruction to a printer having the registration status "Waiting for Approval".

After completion of the processing in step S608, in step S609, the cloud print service system 120 transmits information indicating that the registration status is "Waiting for Approval" to the local IPP service 300.

In step S612, the local IPP service 300 periodically issues a device registration processing request and conforms whether the approval by the administrator is completed in the cloud print service system 120. If the registration status remains "Waiting for Approval", the cloud print service system 120 continues to transmit information indicating that the registration status is "Waiting for Approval" in response to the request issued in step S612. Processing to be performed after the registration status changes to "Approved" will be described below.

In step S612, the cloud print service system 120 transmits a Uniform Resource Locator (URL) for confirmation to the administrator by e-mail. The request may also be transmitted to the administrator by a method other than e-mail. The e-mail includes information about the printing apparatus the registration of which has been requested and information about the user who issued the request.

Upon reception of the e-mail transmitted in step S610, the administrator opens the URL for confirmation by using a browser in step S613.

Subsequently, in step S614, the administrator inputs a user ID having the administrator authority and a password in the front end of the cloud print service system 120 displayed on the activated browser. More specifically, the administrator inputs the user ID having the administrator authority and the password on a screen provided by the cloud print service system 120 displayed on the web browser.

Upon reception of these inputs, in step S616, the cloud print service system 120 verifies the input user ID and password. If the cloud print service system 120 determines that the user has the administrator authority, the cloud print service system 120 changes the status of the printer the registration of which has been requested to "Registered". The cloud print service system 120 may display a page for receiving an input indicating the permission to register from the administrator. In this case, upon reception of the input indicating the permission to register from the administrator on the page, the cloud print service system 120 changes the status of the printer the registration of which has been requested to "Registered". The above-described processing enables the user of the cloud print service system 120 to issue a print request to the printer in the "Registered" status.

If the printer is registered with the "Registered" status in the cloud print service system 120, in step S617, the cloud print service system 120 transmits a device token in response to the device registration processing request issued in steps S612 and S615. Since the device token is associated with a logical printer on the cloud print service system 120, the printing apparatus 111 or the virtual printer registered in the local IPP service 300 sends the device token to the cloud print service system 120 to request the cloud print service system 120 for print data. This enables the printing apparatus 111 to receive the print data for the logical printer from the logical printer associated with the device token.

In step S621, the local IPP service 300 stores the received device token. Then, the processing ends. A virtual printer is registered in the local IPP service 300 in this processing. Subsequently, by using the acquired device token, the local IPP service 300 is able to receive a print job issued to the printer associated with the device token on the cloud print service system 120.

After completion of the processing in step S617, in step S618, the cloud print service system 120 determines whether the registered printer (printing apparatus 112) has been registered based on a registration request from the user ID having the user authority. If the printer registration is based on a registration request from the user ID having the administrator authority (NO in step S618), the processing ends.

On the other hand, if the printer registration is based on a registration request from the user ID having the user authority (YES in step S618), the processing proceeds to step S619. In step S619, the cloud print service system 120 changes the sharing setting of the registered printer to the value indicating "Shared". More specifically, the value indicating "Shared" is stored in the setting 408 in FIG. 4.

Then, the processing proceeds to step S620. In step S620, the cloud print service system 120 identifies the user ID that has issued the device registration processing request based on the token temporarily stored in step S602, and then registers the user ID as a registered printer user. More specifically, the cloud print service system 120 stores the user ID of the user who has issued the registration request in the setting 410 in FIG. 4, as the setting value.

The cloud print service system 120 may be configured to perform the processing in steps S619 and S620 upon reception of an instruction from the control API issuance unit 303 of the local IPP service 300. More specifically, after reception of the device token in step S621, the control API issuance unit 303 of the local IPP service 300 instructs the cloud print service system 120 to register (add) the user ID the registration of which has been requested as the user of the registered printing apparatus. Upon reception of this instruction, the cloud print service system 120 performs steps S619 and S620. In this case, step S618 is omitted.

The cloud print service system 120 may also be configured to allow designation of an administrator for each printer. In this case, the cloud print service system 120 may be configured to store the user ID of the user who has issued a registration request in the setting of the administrator of the printer, instead of the processing in steps S619 and S620. This completes the processing performed by the cloud print service system 120.

In FIGS. 6A and 6B, the example of registering the printing apparatus 112 not conforming to the standard specifications of cloud printing has been described. Thus, in the description, the local IPP service 300 is configured to perform various types of processing with regard to the cloud print service system 120. However, in registering the printing apparatus 111 conforming to the standard specifications of cloud printing, the printing apparatus 111 can perform various types of processing with regard to the cloud print service system 120.

Figure 7B:
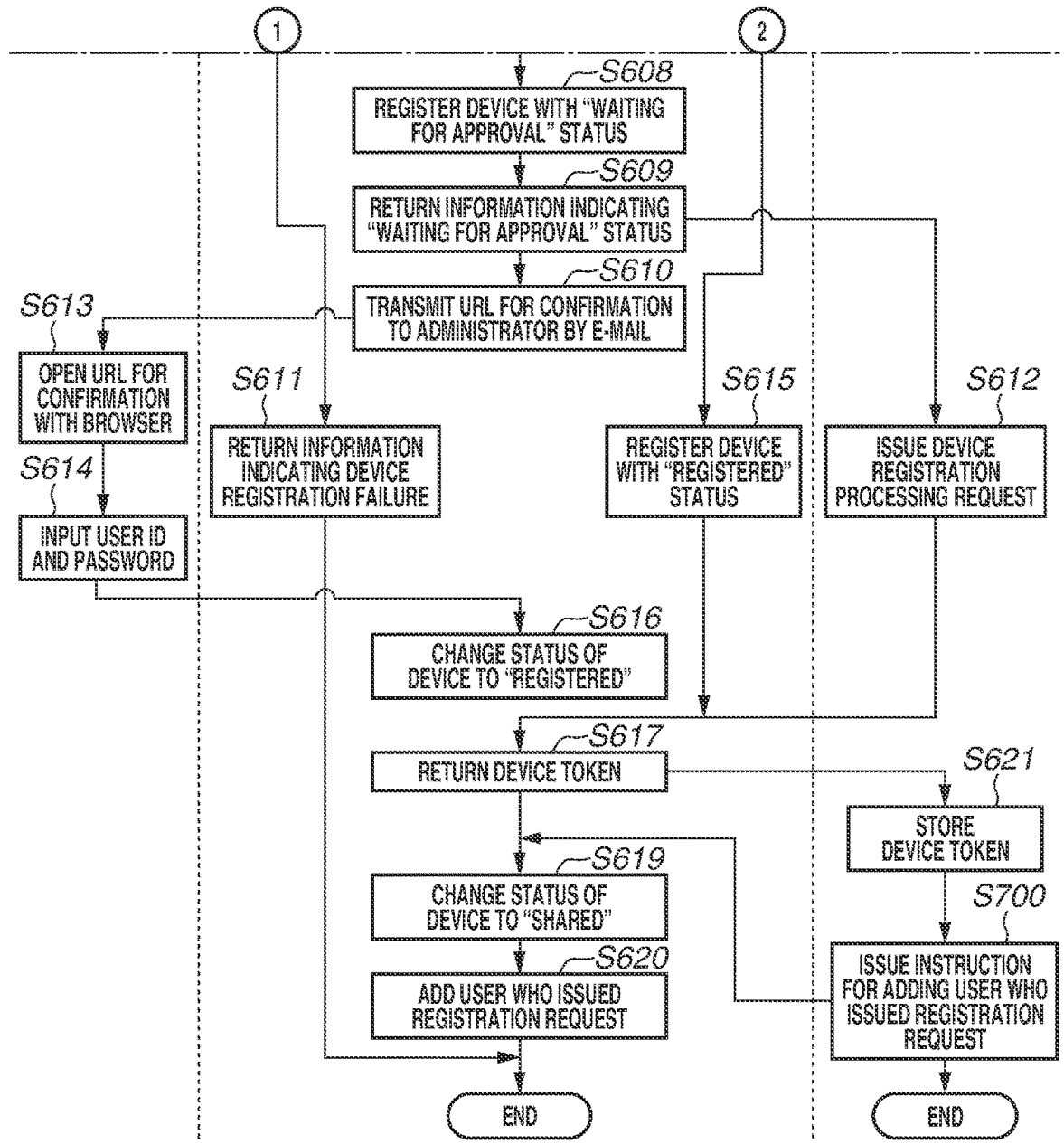

FIGS. 7A and 7B illustrate a sequence when the printing apparatus 111 performs the processing. The sequence in FIGS. 7A and 7B differs from the sequence in FIGS. 6A and 6B in that the processing performed by the local IPP service 300 in FIGS. 6A and 6B are replaced with processing performed by the printing apparatus 111, step S700 is added, and step S618 is deleted. The sequence in FIGS. 7A and 7B is similar to the sequence in FIGS. 6A and 6B in other points.

After reception of the device token in step S621, the printing apparatus 111 instructs the cloud print service system 120 to register (add) the user ID the registration of which has been requested as the user of the registered printing apparatus. Upon reception of the instruction, the cloud print service system 120 performs steps S619 and S620.

In the present exemplary embodiment, as with FIGS. 6A and 6B, the cloud print service system 120 may be configured to perform the processing in steps S618 to S620 after completion of the processing in step S617 without the printing apparatus 111 performing the processing in step S700.

As described above, in the present exemplary embodiment, the cloud print service system 120 enables not only a user having the administrator authority but also a user having the user authority to register a printing apparatus. The local IPP service 300 performs the processing in step S612 to instruct the cloud print service system 120 to register the user having the user authority. Other processing is basically the same as the procedure in which the user having the administrator authority registers a printing apparatus in the cloud print service system 120. Thus, a simple function expansion enables the user having the user authority to implement the printing apparatus registration.

The cloud print service system 120 in the present printing system allows setting of information indicating whether to permit the printing apparatus registration by the user having the user authority based on an instruction from the administrator. This enables inhibiting the printer registration by the user having the user authority in a case where the administrator determines that the registration is not required, resulting in improved security.

The cloud print service system 120 can set a user ID permitted to perform the printer registration among the user IDs having the user authority based on an instruction from the administrator. This enables, for example, a specific user who is remotely working to register a printer, resulting in improved security.

Further, the cloud print service system 120 can set whether the confirmation by the administrator is required at the time of the printer registration by the user having the user authority. This enables the administrator to perform flexible operations depending on the use form. For example, in a case where many users who are remotely working register a printer, setting "Not Required" for "Confirmation by Administrator" makes it unnecessary for the administrator to perform the operation to approve many registration requests. Once the user completes the registration of a printer, the user can immediately use the printer. On the other hand, setting "All Users" for "User Permitted to Register Printer" and setting "Required" for "Confirmation by Administrator" make it unnecessary for the administrator to preregister a permitted user. On the contrary, when a registration request is received, the administrator can approve the registration request while successively conforming the contents of the registration request.

When the registration in FIGS. 6A and 6B is completed, the user having the user ID (for example, User A) who has issued the registration request can issue a print instruction to the registered printing apparatus 112. For example, if the user logs into the cloud print service system 120 as User A by using the information processing apparatuses 130 or 140 and issues a print instruction to the printing apparatus 112, the user can cause the printing apparatus 112 to perform printing. If User A registers the printing apparatus 111, User A can cause the printing apparatus 111 to perform printing through similar processing.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

One or more embodiments of the present disclosure makes it easier to register a printing apparatus.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-128625, filed Jul. 29, 2020, which is hereby incorporated by reference herein in its entirety.

What is claimed is:

1. A printing system comprising a printing apparatus and a server system,
    wherein the server system comprises:
    a setting unit configured to, based on an input from a user having first authority, set information indicating whether to permit registration of a printing apparatus based on a registration request from a user having second authority being more limited than the first authority; and
    a registration processing unit configured to, in a case where a registration request for registering a printing apparatus is received, perform processing for registering the printing apparatus based on the registration request,
    wherein, in a case where the user who has issued the registration request has the second authority and where the setting unit sets information indicating that the registration of a printing apparatus based on the registration request from the user having the second authority is permitted, the registration processing unit performs the registration of a printing apparatus based on the registration request from the user having the second authority,
    wherein, by execution of the registration, the printing apparatus becomes capable of receiving a print job based on a print instruction from the user having the second authority via the server system, and
    wherein, in a case where the user who has issued the registration request has the second authority being more limited than the first authority and where the setting unit does not set the information indicating that the registration of a printing apparatus based on the registration request from the user having the second authority is permitted, the registration processing unit does not perform the registration of a printing apparatus based on the registration request from the user having the second authority.

2. The printing system according to claim 1,
    wherein the setting unit further sets permitted user information indicating a user permitted to perform the registration of a printing apparatus among users having the second authority based on an input from the user having the first authority, and
    wherein, in a case where the user who has issued the registration request has the second authority being more limited than the first authority, where the setting unit sets the information indicating that the registration of a printing apparatus based on the registration request from the user having the second authority is permitted, and where information indicating the user who has issued the registration request is included in the permitted user information, the registration processing unit performs the registration of a printing apparatus based on the registration request from the user who has issued the registration request.

3. The printing system according to claim 2, wherein, in a case where the user who has issued the registration request has the second authority being more limited than the first authority, where the setting unit sets the information indicating that the registration of a printing apparatus based on the registration request from the user having the second authority is permitted, and where the information indicating the user who has issued the registration request is not included in the permitted user information, the registration processing unit does not perform the registration of a printing apparatus based on the registration request from the user who has issued the registration request.

4. The printing system according to claim 1, wherein, before performing the registration based on a registration request from the user having the second authority, the registration processing unit performs processing for acquiring approval from the user having the first authority.

5. The printing system according to claim 1, wherein, by execution of the registration, the printing apparatus becomes capable of receiving a print job based on a print instruction from the user having the second authority who has issued the registration request.

6. The printing system according to claim 1, wherein the printing apparatus is a virtual printer to be registered to an application stored in an information processing apparatus.

7. The printing system according to claim 1, wherein the printing apparatus is capable of performing printing based on the print job.

8. A server system comprising:
    a setting unit configured to, based on an input from a user having first authority, set information indicating whether to permit registration of a printing apparatus based on a registration request from a user having second authority being more limited than the first authority; and
    a registration processing unit configured to, in a case where a registration request for registering a printing apparatus is received, perform processing for registering the printing apparatus based on the registration request,
    wherein, in a case where the user who has issued the registration request has the second authority and where the setting unit sets information indicating that the registration of a printing apparatus based on the registration request from the user having the second authority is permitted, the registration processing unit performs the registration of a printing apparatus based on the registration request from the user having the second authority, and
    wherein, in a case where the user who has issued the registration request has the second authority being more limited than the first authority and where the setting unit does not set the information indicating that the registration of a printing apparatus based on the registration request from the user having the second authority is permitted, the registration processing unit does not perform the registration of a printing apparatus based on the registration request from the user having the second authority.

9. A printing apparatus configured to communicate with a server system,
wherein the server system comprises:
a setting unit configured to, based on an input from a user having first authority, set information indicating whether to permit registration of a printing apparatus based on a registration request from a user having second authority being more limited than the first authority; and
a registration processing unit configured to, in a case where a registration request for registering a printing apparatus is received, perform processing for registering the printing apparatus based on the registration request,
wherein, in a case where the user who has issued the registration request has the second authority and where the setting unit sets information indicating that the registration of a printing apparatus based on the registration request from the user having the second authority is permitted, the registration processing unit performs the registration of a printing apparatus based on the registration request from the user having the second authority,
wherein, when the printing apparatus transmits the registration request for registering a printing apparatus, and the server system performs the registration based on the transmitted registration request, the printing apparatus becomes capable of receiving a print instruction from the user having the second authority via the server system, and
wherein, in a case where the user who has issued the registration request has the second authority being more limited than the first authority and where the setting unit does not set the information indicating that the registration of a printing apparatus based on the registration request from the user having the second authority is permitted, the registration processing unit does not perform the registration of a printing apparatus based on the registration request from the user having the second authority.

10. The printing apparatus according to claim 9, wherein the printing apparatus instructs the server system to register the user who has issued the registration request to the server system.

* * * * *